March 26, 1968
W. E. McHUGH ET AL  3,375,169
METHOD FOR MINIMIZING CORROSION OF REACTOR ELEMENTS
Filed Aug. 23, 1966
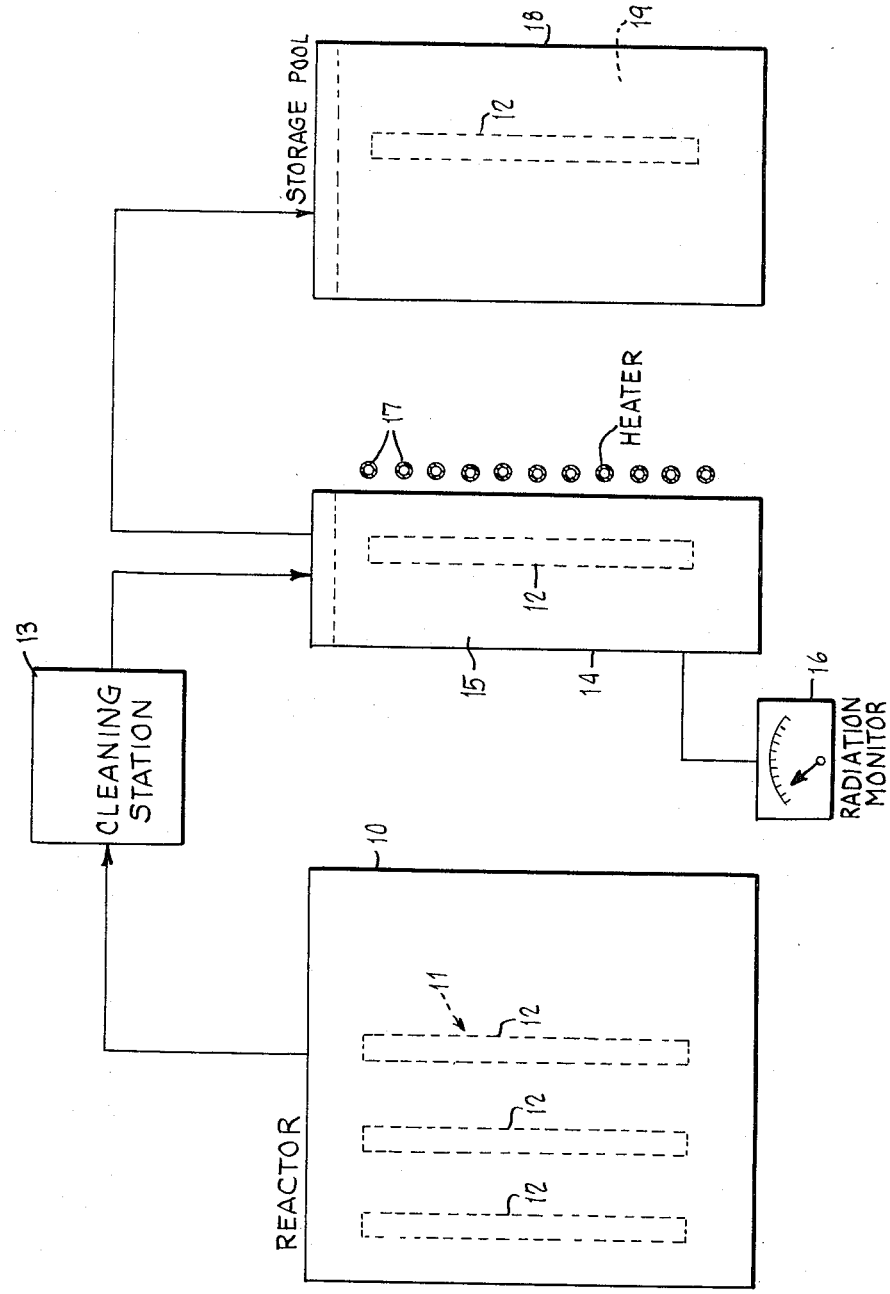

3,375,169
METHOD FOR MINIMIZING CORROSION OF REACTOR ELEMENTS

William E. McHugh, Madison Heights, and Albert A. Shoudy, Jr., Royal Oak, Mich., assignors to Atomic Power Development Associates, Inc., Detroit, Mich., a corporation of New York
Filed Aug. 23, 1966, Ser. No. 574,445
2 Claims. (Cl. 176—30)

ABSTRACT OF THE DISCLOSURE

A method of minimizing the corrosion of a reactor element by removing the element from a reactor core and placing it in a tank of liquid. Then the element is treated with an electrolysis metal plating additive of nickel or chromium to form a corrosion resistant plating thereon, and then the element is transferred to a storage pool.

---

This invention relates generally to a method of remotely minimizing the corrosion of sensitized fuel clad or blanket elements, subassemblies or so-called "fuel pins" used in atomic reactors and to methods by which ruptures in the cladding of such elements may be remedied by selectively plating with a corrosion resistant material at controlled parameters without undue interference with the normal reactor maintenance operations.

The present invention provides a method by which fuel or blanket elements which are being removed from the reactor core for placing in a water storage pool, may be subjected to a fission product leakage test and plated or replated, preferably by but not limited to an electroless plating process without undue interference with normal operations and without requiring expensive additional equipment, and yet be capable of being performed with avoidance of radiation hazards to operators.

The method is particularly adapted for use in conjunction with the operation of the known types of fast breeder reactors of the sodium-cooled type, but may also be applicable for use with the various other types of reactors without detracting from the spirit of the invention.

The reactor core of the fast or breeder reactors comprises fuel and blanket elements combined in a predetermined geometrical configuration. A fuel element contains the fissionable material while the blanket element contains a fertile material which may become fissionable upon bombardment by neutrons. The elements may be of any convenient shape and are generally surrounded or clad with metal wrappers or tubes of stainless steel, zirconium or other metal. The wrapper tube or metal cladding surrounds the fissionable or fertile material and completely seals same therein.

One of the causes of failure in such fuel or blanket elements is due to corrosion or rupture occurring in the cladding material, thereby allowing free release of radioactive fission products into the surrounding medium. The problem is inherent in cladding material such as stainless steel when reactor conditions create a sensitization in the stainless steel within the approximate temperature range of between 700° and 1300° F. This sensitization of the cladding material creates a great susceptibility to corrosion and resultant leakage.

There are various times during the normal cycling and reloading operations in the reactor core that fuel or blanket elements are removed from the core itself and retained for an indefinite length of time in storage tanks or pools, such pools normally being filled with water to minimize any danger that radiation will escape to the surrounding areas, as well as to provide for cooling.

Intermediate steps are commonly employed immediately after such removal, whereby the fuel or blanket elements are generally cleaned or placed in so-called "leaker cans." The purpose of this operation is to test for, or monitor any leaking radiation.

As may be well understood, the removal from a non-corrosive atmosphere into readily corrosive surroundings, coupled with the sensitization of the clad material, creates a very susceptible situation with respect to clad integrity. Such corrosion may evidence itself initially during the steam cleaning operation, during the tenure in the leaker can, or later in the storage tanks.

In accordance with the present invention, the steps of testing the fuel elements and the like for leakage, and the amount of such leakage, as well as the steps for remedying or preventing same, are conveniently and in effect combined by carrying out same while the elements are in the leaker cans. That is, the already available remotely-controlled handling equipment may be utilized to remove the elements in the usual way from the reactor, take them through the cleaning station and into the leaker can where the elements are surrounded by water or other liquid which may be monitored to determine whether and to what extent radiation leakage occurs from each particular element. Then, upon that determination, while the elements are still in the leaker can, the necessary ingredients are introduced into the liquid or as a replacement liquid embodying the materials required to plate the elements preferably by an electroless plating method known per se. After that, the already available remotely-controlled handling equipment may be utilized to remove the elements from the leaker can, which have now been plated or replated to the extent necessary and to deposit same in the usual storage or so-called cut-up pool containing water or other aqueous medium.

The plating method serves both to heal failed metallic fuel or blanket elements, as well as to drastically diminish the possibility of a failure due to later corrosion occurring in the storage pools, and thus also to prevent contamination of the storage pool, even during long time storage.

It further will be apparent that the present invention provides in effect a selection method whereby only certain fuel or blanket elements are subjected to the plating process, such selection of those which need plating being determined by the radiation monitoring. At the same time it will be apparent that a further advantage of the present invention is that it provides a controlled plating method whereby the degree of plating desirable or necessary may be determined and carried out, dependent on the intensity of radiation monitored in the leaker can.

The present invention provides a method of preventing failures subsequent to removal from the reactor and to heal failures in fuel or blanket element subassemblies and fuel pins whereby the entire operation may be carried on remotely in the absence of personnel near the area of the operation, thereby affording safe working conditions.

Various further and more specific objects, features and advantages of the invention will appear from the description given below, taken in connection with the accompanying drawings, illustrating by way of example preferred forms of the invention.

The drawing comprises a schematic view showing the method of the present invention.

In the embodiment shown in the drawing, the nuclear reactor is indicated at 10. The reactor core 11 is generally centrally located within the reactor vessel and comprises a predetermined number of elements 12. In the breeder reactor, such elements are either fuel elements containing fissionable material or blanket elements containing a fertile material. The method contemplated by the present invention is applicable to either type of element and therefore no distinction between the two will hereafter be drawn.

A remote means of any suitable known form, not shown, is provided to transfer the elements 12 from the reactor core 11 to a cleaning station 13 (for example a steam cleaning means), and thence to a leaker can 14. The remote means includes generally devices which withdraw the elements, and move the elements through a predetermined path as indicated generally by the arrows.

The leaker can 14 may also be formed of stainless steel and is substantially filled with a body of water 15.

Radiation monitoring means indicated at 16 of any suitable known type is provided to determine the intensity of radiations within the leaker can after the element is placed therein and submerged. Such monitoring means, if desired, may be of a type affording continuous ascertainment of the radiation level.

In some cases, the monitoring means may, of course, fail to indicate that there is sufficient radiation leakage from the element in the leaker can to necessitate any plating of the element to heal a failed element. In that event, it may be promptly withdrawn from the leaker can and carried over to the storage pool 18 containing a suitable aqueous storage liquid 19, without further ado unless one wishes to plate the element to prevent subsequent corrosion. On the other hand, if the monitoring means indicates that the element in the leaker can has ruptures in its cladding so that substantial or excessive amounts of radiation is escaping therefrom, then in the usual case, the liquid would be withdrawn from the leaker can and replaced by a suitable electroless plating liquid of a type and of a concentration adequate to deposit a substantial plating of nickel or chromium onto the surfaces of the element.

The technicians may readily determine by experience the amount of such plating apparently required depending upon the intensity of the escaping radiation as indicated by the monitoring means and the concentration of the plating liquid and the duration of its application may be gauged accordingly. Then, if desired, after the plating has been accomplished, the liquid plating composition may be withdrawn and replaced if desired by water which may be again monitored to determine whether the leaking conditions have been adequately remedied. If not, of course, another plating operation may be carried out before the element is carried on to the storage pool. Even if no radiation is originally detected one can plate a non-failed element to prevent further corrosion during aqueous storage.

Although it will generally be preferred to use an electroless plating method of suitable known type in order that the danger of pinholes or the like or irregularities in the plating may be avoided, other plating methods may sometimes be adequate. Typical electroless plating baths and methods are disclosed in U.S. Patent No. 2,975,073, for example. Sometimes it may be desirable to surround the leaker can with a heating coil as indicated at 17 or to use other suitable heating means to maintain the conditions in the can at the most desirable temperature for carrying out these operations therein.

From the foregoing description, it will be seen that the invention provides a method of remotely remedying corrosion susceptibility in fuel or blanket elements or the like used in atomic reactors, without detracting to any substantial extent from normal reactor storage operations and yet provide adequate protection to the elements.

Although particular embodiments of the invention are herein disclosed for purposes of explanation, further modifications thereof after study of the specification, will be apparent to those skilled in the art to which the invention pertains. Reference should accordingly be had to the appended claims in determining the scope of the invention.

What is claimed and desired to be secured by Letters Patent is:

1. Method for minimizing corrosion of reactor elements comprising the following combination of steps: removing an element from a reactor core, placing same in a leaker tank containing liquid, monitoring the liquid in such tank to determine the amount of radiation emitted from the element within the leaker tank, treating the element in the leaker tank with an electroless metal plating additive of the group consisting of nickel and chromium, whereby a corrosion resistant plating of substantial thickness is formed thereon, and then transferring the element to a storage pool.

2. Method in accordance with the foregoing claim 1 and in which after said monitoring, the specific element or elements are selected which have radiation intensities above a predetermined level and are then subjected to said plating in said tank.

References Cited

UNITED STATES PATENTS

| | | | |
|---|---|---|---|
| 2,846,872 | 8/1958 | McAdams et al. | 176—19 |
| 3,137,397 | 6/1964 | Nicoll et al. | 176—30 |
| 3,180,800 | 4/1965 | Fortescue et al. | 176—30 |

L. DEWAYNE RUTLEDGE, *Primary Examiner.*

CARL D. QUARFORTH, *Examiner.*

H. E. BEHREND, *Assistant Examiner.*